United States Patent [19]

Pieronek et al.

[11] Patent Number: 5,394,152
[45] Date of Patent: Feb. 28, 1995

[54] RADAR PROCESSING APPARATUS AND METHOD

[75] Inventors: James V. Pieronek, Acton; Jeffrey L. Gertz, Marblehead, both of Mass.

[73] Assignee: Massachusetts Institute of Technology, Cambridge, Mass.

[21] Appl. No.: 100,773

[22] Filed: Aug. 2, 1993

[51] Int. Cl.6 .............................................. G01S 13/80
[52] U.S. Cl. ....................................... 342/40; 342/195
[58] Field of Search ................. 342/40, 194, 195, 196, 342/197

[56] References Cited

U.S. PATENT DOCUMENTS

| | | | |
|---|---|---|---|
| 4,688,046 | 8/1987 | Schwab | 342/456 |
| 5,073,779 | 12/1991 | Skogmo et al. | 342/37 |
| 5,097,268 | 3/1992 | Bauer, Jr. et al. | 342/160 |
| 5,103,233 | 4/1992 | Gallagher et al. | 342/408 |

Primary Examiner—John B. Sotomayor
Attorney, Agent, or Firm—Testa, Hurwitz & Thibeault

[57] ABSTRACT

A radar processor comprises a multi-port memory device having memory which can be accessed by at least three ports. A first port receives input data from a data providing means. A second port couples a first processor which performs radar processing. A third port couples at least one second processor which assists the first processor by also performing radar processing. The multi-port memory device further includes an arbiter for coordinating and determining when each of the three ports can access the memory of the multi-port memory device. The first and second processors share information with each other via the multi-port memory device.

6 Claims, 11 Drawing Sheets

# 5,394,152

RADAR PROCESSING APPARATUS AND METHOD

This invention was made with government support under Contract Number F19628-90-C-0002 awarded by the Air Force. The government has certain rights in the invention.

BACKGROUND OF THE INVENTION

This invention relates to radar processing apparatus and methods and, more particularly, to such apparatus and methods for processing signals including radar return (i.e., primary target) signals and beacon reply signals from, for example, aircraft on the ground or in the air.

Radar systems for detecting moving targets have been used in a variety of applications including the control of airport traffic. Systems to control aircraft traffic on an airport surface and in the air above the airport are in use in airports across the United States and elsewhere. These systems provide positional information to help direct aircraft and thus prevent them from colliding with each other and with other non-aircraft objects such as luggage-carrying vehicles traveling on the airport surface.

One radar system currently being used to control airport traffic in airports in the United States is known as the Airport Surveillance Radar-9 (ASR-9). The ASR-9 was developed and tested in the 1970s and 1980s, and it was deployed sometime around 1990. When used in airports in urban locations, the performance of the ASR-9 typically degrades due to, for example, the reflection (i.e., multipath or multipathing) of beacon signals and radar return (i.e., primary target) signals, ground traffic breakthrough, and the ASR-9's limited azimuth resolution of closely spaced targets. In areas where large numbers of aircraft are operating, beacon reply signals are often overlapped or "garbled", further degrading the ASR-9's performance and effectiveness.

Briefly and in general, when a radar beam or radar pulse (transmitted by, for example, an airport traffic control radar system such as the ASR-9) is incident upon an aircraft in the air, one or more beacon reply signals are emitted by a transponder in the aircraft. The beacon signals contain identifying information about the aircraft such as aircraft type, flight number, aircraft number, and aircraft altitude. In addition to the positional information provided by airport radar systems, the identifying information contained in the beacon signals can be displayed to an air traffic controller to provide the controller with a more complete picture of the airport traffic.

In general, the ASR-9 is not capable of compensating for the problems encountered when it is used in urban airport settings. More specifically, an Array Signal Processor (ASP) within the ASR-9 generally lacks the memory and processing power necessary to execute advanced signal processing techniques which have the potential to compensate for one or more of the problems encountered when operating the ASR-9 in an urban setting.

It is desired to eliminate or mitigate the performance problems of an ASR-9 operating in an urban airport setting. It also is desired to minimize the cost of addressing these performance concerns.

SUMMARY OF THE INVENTION

To address the performance concerns raised by the use of an ASR-9 in an urban airport setting while minimizing the cost associated with achieving the desired performance results, an existing ASR-9 is utilized as a foundation of a new radar surveillance processing system. The new radar processing system can achieve levels of performance and effectiveness not attainable by a conventional ASR-9.

A surveillance radar processing system according to the invention differs significantly, both structurally and functionally, from a conventional ASR-9. The new radar processing system includes a multi-port memory device which receives both radar return (i.e., primary return) and beacon reply signals on one port. The ASR-9's Array Signal Processor (ASP) is coupled to another port, and at least one auxiliary processor is connected to still another port of the multi-port memory device. The new system has the processing power to perform the advanced signal processing necessary to compensate for one or more of the factors which lead to the overall poor performance of a conventional ASR-9 operating in an urban environment.

Because the new radar processing system is based on a conventional ASR-9, the cost of the new system is significantly lower than the cost would be if the performance concerns of the ASR-9 were addressed by designing and developing a replacement system from scratch. The new surveillance radar processing system can be put on a single board or card which replaces an existing board of the conventional ASR-9, specifically, a Dual-Port Random Access Memory (DPRAM) board. The single board with the new radar processing system replaces a DPRAM board with no further modifications to the conventional ASR-9 system.

In general, in one aspect, the invention features a radar processor which comprises a multi-port memory device having memory which can be accessed by at least three ports. A first port receives input data from a data providing means. A second port couples a first processor which performs radar processing. A third port couples at least one second processor which assists the first processor by also performing radar processing. The multi-port memory device further includes an arbiter for coordinating and determining when each of the three ports can access the memory of the multi-port memory device. The first and second processors communicate with each other via the multi-port memory device.

Other aspects, features, and advantages of the invention will become apparent from the following description and from the claims.

DETAILED DESCRIPTION

An Airport Surveillance Radar-9 (ASR-9) is a radar system which is used in airports across the United States to aid in aircraft traffic control. The ASR-9 has removable plug-in boards or cards which include processing circuitry thereon. Several of the boards comprise a programmable Array Signal Processor (ASP) which, among other tasks, processes beacon reply signals and radar return (i.e., primary target) signals to create target reports. The ASP also generates two-level weather reports. Functionally, the ASP is a part of a receiver-processor portion of the ASR-9. The ASP performs most of its communication with the rest of the ASR-9 system via two Dual-Port Random Access Memory (DPRAM) boards. Each of the DPRAMs are on a single board.

Figure 1:
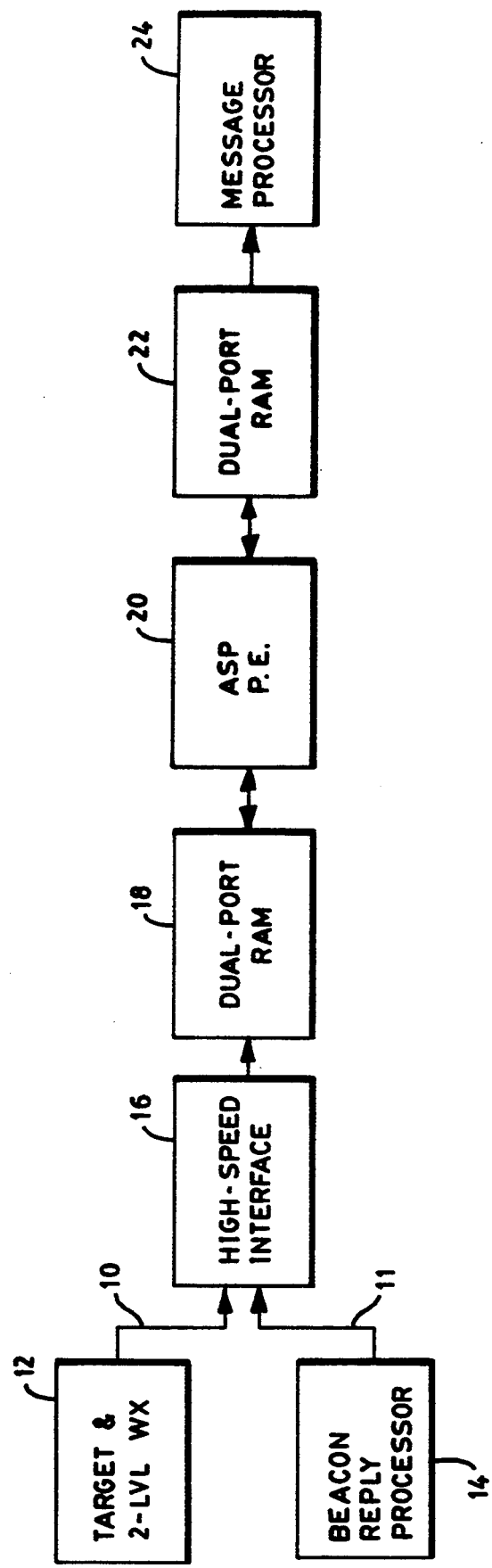
FIG. 1 is diagram of a portion of an Airport Surveillance Radar-9 (ASR-9) including an Array Signal Processor (ASP) and two Dual-Port Random Access Memories (DPRAMs).

Referring to FIG. 1, in a conventional ASR-9 system, primary target data 10 from a Target and Two-Level Weather Detector (TGT & 2-LVL WX) 12 and beacon reply data 11 from a Beacon Reply Processor (BRP) 14 are interleaved by a High Speed Interface Buffer (HSIB) 16 and passed to a DPRAM 18. This data is stored in the DPRAM 18. An ASP 20 uses the data in the DPRAM 18 to generate two sets of output data, namely, target reports and two-level weather reports. The ASP 20 stores these reports in another DPRAM 22. A Message Interface Processor (MIP) 24 removes the reports from the DPRAM 22 and formats the reports for serial transmission to an indicator site (not shown) for eventual display on air traffic control displays (not shown) via a Surveillance Communication Interface Processor or SCIP (not shown). The MIP 24 also can control the ASP 20. For example, the MIP 24 can send requests (through the DPRAM 22) to the ASP 20 to initiate built-in tests and fault isolation tests, the results of which are passed (through the DPRAM 22) back to the MIP 24. The MIP also has the ability to start, stop, reset and single-step the ASP 20 by setting a control register in the ASP 20.

The ASP is a bit-slice processor which utilizes a "Harvard" architecture featuring independent instruction and data buses. The ASP has a 16-bit wide data path and an instruction path which is 54-bits wide. A maximum of 32,768 instructions can be stored in eight instruction pages of 4,096 instructions each. The ASP runs synchronously from an approximately 8MHz clock which is derived by dividing the ASR-9's 31.07 MHz coherent oscillator signal by four. The ASP has a scratchpad memory containing of 4,096 16-bit words of static memory.

Each of the DPRAM boards contain 65,536 16-bit words of memory. A 16,384 word section of each DPRAM is shared by the ASP and an external interface. The remaining 49,152 words of memory on each DPRAM board are used as general data memory by the ASP for the storage of maps, target files, and other data that will not fit into the scratchpad memory.

The ASP is described further in technical documentation provided with the ASR-9.

Figure 2:
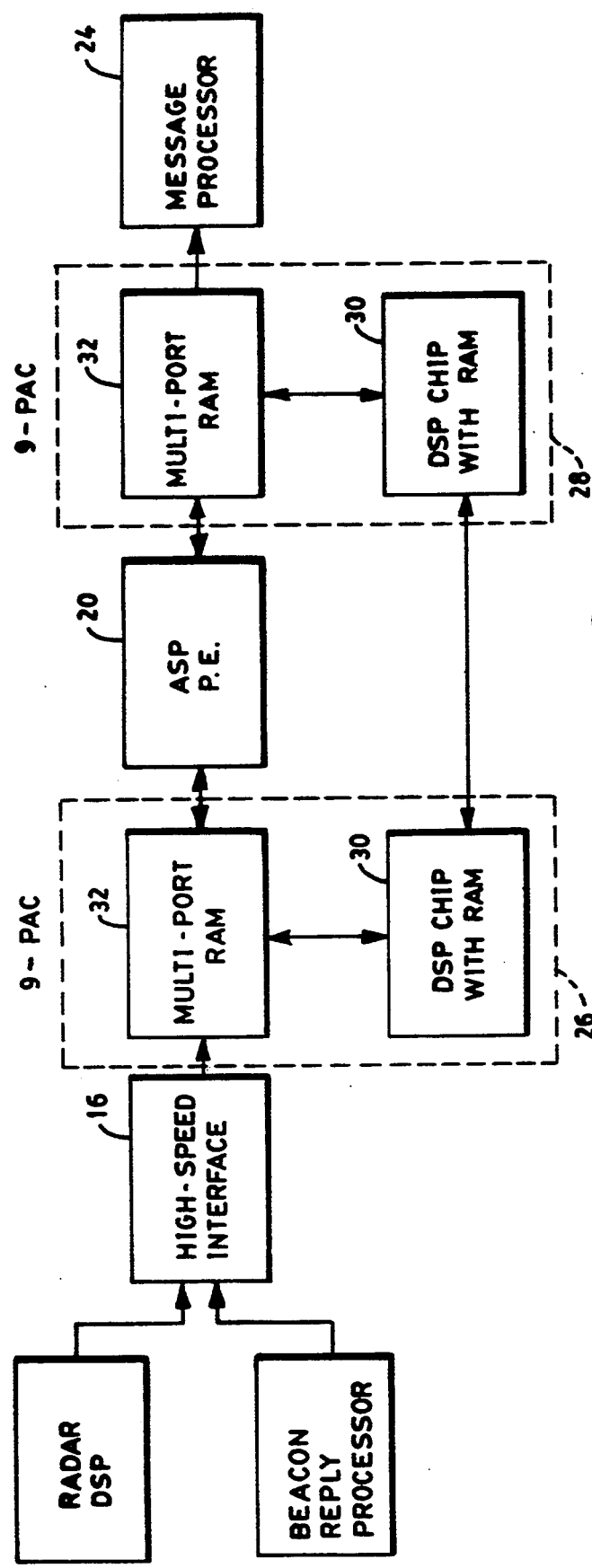
FIG. 2 is a diagram of a portion of a modified ASR-9 including the ASP and ASR-9 Processor Augmentation Cards (9-PACs) according to the invention.

Referring to FIG. 2, in accordance with the invention, one or both of the DPRAM boards of the conventional ASR-9 are replaced by a single-board computer 26, 28 termed the ASR-9 Processor Augmentation Card (9-PAC). Both DPRAMs are shown replaced by 9-PACs in FIG. 2. The single-board 9-PAC operates in place of the DPRAM with no further modifications to the ASR-9 system. That is, to replace a DPRAM with a 9-PAC, it is only necessary to remove the DPRAM board from the ASR-9 and insert the 9-PAC in its place; no rewiring or change of any kind to the ASR-9 is required beyond swapping the DPRAM board for the 9-PAC board. In the disclosed embodiment, the 9-PAC includes at least one auxiliary processor 30 and a multi-port memory 32 to which the ASP 20, the auxiliary processor(s) 30, and either the HSIB 16 or the MIP 24 are coupled. The 9-PAC has superior processing capabilities as compared to the conventional DPRAM board which it replaces. The 9-PAC has the architecture and the computational power to execute the advanced signal processing procedures (described below) necessary to dramatically improve the degraded performance encountered when operating a conventional ASR-9 with a conventional DPRAM board in an urban environment.

Figure 3:
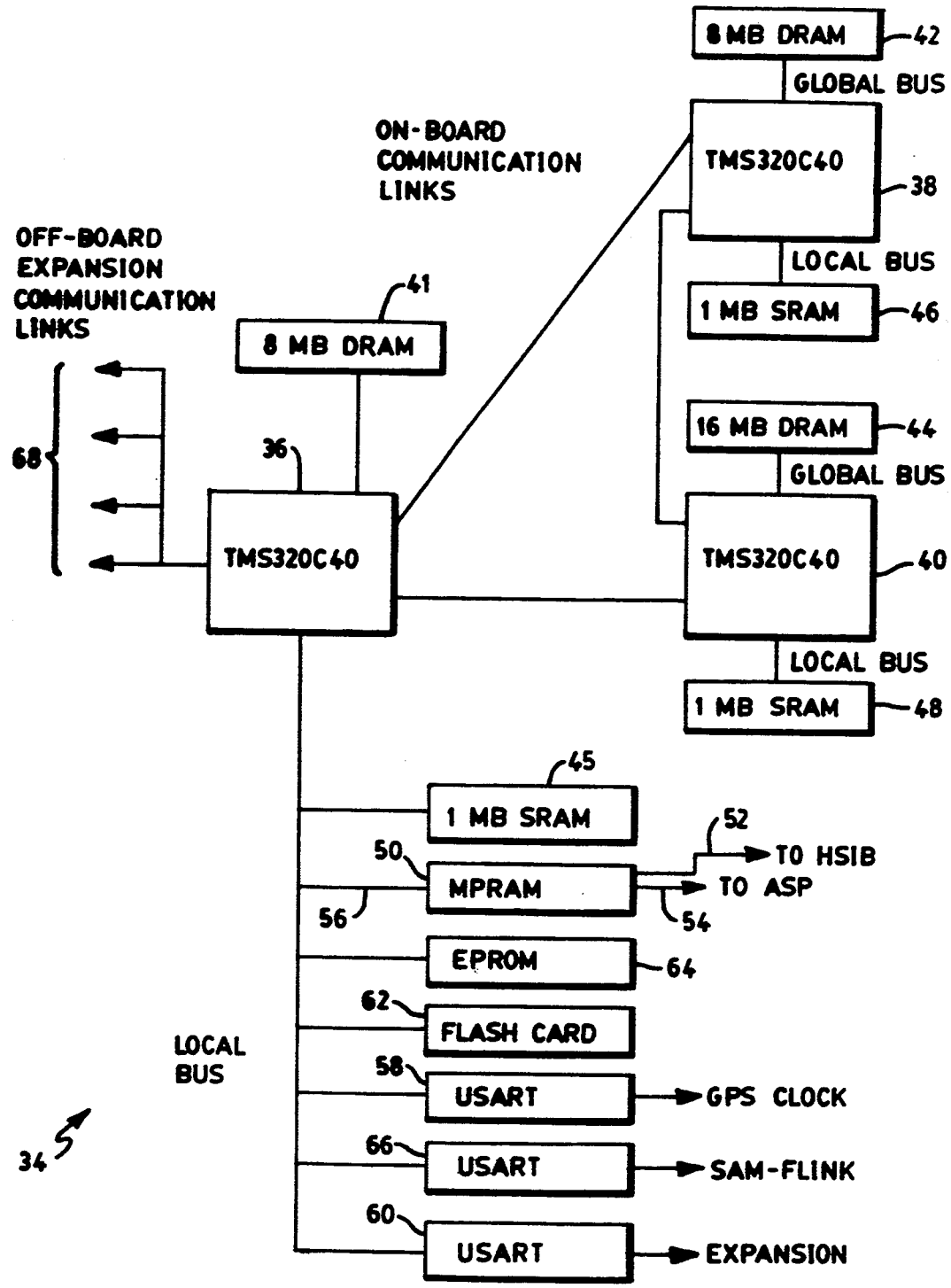
FIG. 3 is a diagram of one of the 9-PACs of FIG. 2.

In the embodiment shown in FIG. 3, a 9-PAC board 34 according to the invention includes a processor 36 such as a digital signal processor (DSP) available from Texas Instruments as part number TMS320C40. The 9-PAC 34 also can include one or more additional processors such as DSPs 38, 40. The DSPs 36, 38, 40 are shown interconnected to allow them to, for example, communicate and cooperatively perform tasks. In the disclosed embodiment, the DSP 36 acts as the main or housekeeping processor of the 9-PAC 34. Each of the DSPs 36, 38, 40 have direct access to 8 or 16Mbytes of dynamic random access memory (DRAM) 41, 42, 44, and all DSPs 36, 38, 40 have direct access to 1Mbyte of static RAM (SRAM) 45, 46, 48. Other variations are possible. For example, more or less than three processors can be employed, and the size and type of memory can be adjusted.

In FIG. 3, the multi-port memory is embodied by a multi-port RAM (MPRAM) 50 having three ports 52, 54, 56. One of the ports 52 couples input data from, for example, the HSIB (identified but not shown in FIG. 3) to the MPRAM 50. The other two ports 54, 56 couple the ASP (identified but not shown in FIG. 3) and the main DSP 36 to the MPRAM 50. In other embodiments, the multi-port memory can have more than three ports. For example, three ports can be dedicated as indicated for the MPRAM 50 and one or more additional ports can be used to couple processors other than the main DSP 36.

The MPRAM 50 of the 9-PAC 34 includes two circular or ring buffers. The primary target report data (FIG. 1) is written into one of the ring buffers by the HSIB. The HSIB writes the beacon reply data (FIG. 1) into the other ring buffer. The MPRAM 50 also includes two registers that latch an address bus of the HSIB each time the HSIB writes a data value into either the primary target ring buffer or the beacon reply ring buffer. Each of the registers is accessible by one or more of the 9-PAC DSPs, and each includes copies of ring buffer pointers which indicate, for example, the next available location and the beginning location.

Commercially-available (e.g., from Micron Technology, IDT, Toshiba, and Sony) memory devices such as a 64K by 9-bit RAM chip or a 128K by 9-bit RAM chip can be used in a hardware implementation of the MPRAM 50 circuitry on the 9-PAC 34 board. In one embodiment, two such RAM chips constitute the memory portion of the MPRAM 50 circuitry. The logic and control portions of the MPRAM circuitry can also be built from commercially-available components. In general, these portions of the MPRAM circuitry perform an arbitration function, i.e., the function of coordinating and determining when each port of the MPRAM can access the memory portion.

An arbiter for performing the arbitration function gives the ASP the highest priority. The HSIB gets the second highest priority, and the processors of the 9-PAC have the lowest priority. This arbiter is compatible with the conventional ASR-9 system in which a two-port arbiter gives priority to the ASP accesses over the HSIB accesses.

As mentioned above, the DSP 36 is the main processor of the 9-PAC 34. The main DSP 36 generally handles all housekeeping and interface functions. These functions include the MPRAM 50 interface, a Global Positioning System (GPS) interface 58, a general purpose serial port 60, management of a flash memory 62, bootstrapping from an EPROM 64, a Surveillance Advanced Message Format (SAMF) High-level Data Link Control (HDLC) interface 66, and one or more off-board communication links 68.

For the 9-PAC board to be easily, completely, and transparently replaceable with a conventional DPRAM board of a conventional ASR-9 system, the 9-PAC has its programs stored on-board. These programs perform, at a minimum, the functions necessary to increase the performance of the conventional ASR-9 system. The 9-PAC also can include programs that perform one or more functions which are performed by the ASP in the conventional ASR-9 system. Furthermore, the 9-PAC can maintain daily-updated reflector maps in on-board memory. These maps have persistences that cover periods of several weeks. Revision-level and maintenance history information also can be maintained in the on-board memory of the 9-PAC. The large amount of data that might be stored on-board and the numerous lines of code needed to perform all of the desired functions require the 9-PAC to have at least 2Mbytes of on-board memory, preferably non-volatile, writeable memory. This memory can be one or more read only memory (ROM) devices such as PROMs (including EPROMs and EEPROMs) and/or flash memories.

The 9-PAC's non-volatile on-board memory can use EEPROM technology. This technology, however, currently is limited to 1 to 4Mbit devices. Flash memory devices with 8Mbits are commercially available but require 12 volts for the write function. Small power supplies capable of generating the necessary 12 volts exist, but the board space required by such a small power supply typically equals the space saved by using the higher-density small-sized flash memories. In general, flash memory is organized in blocks, similar to how a disk is organized. Erasing and writing of flash memory is done at the block level. A flash memory system can be made to look like a disk drive. One disadvantage of flash memories is that they have a limit of 100,000 write cycles. EEPROMs have a similar limit. This should not be a problem as field operation typically only requires updating the file once per day, which gives a lifetime of about 273 years for either a flash memory or an EEPROM.

The disclosed embodiment of the 9-PAC 34 includes a Personal Computer Memory Card International Association (PCMCIA) Advanced Technology Attachment (ATA) memory card 62 containing 20 megabytes of flash memory. The flash memory card 62 is attached to the 9-PAC via a socket and can be removed for programming. The flash memory card is used to store 9-PAC software and maps generated by the 9-PAC software. In the event of a hardware failure of a 9-PAC, the flash memory card can be removed from the failed 9-PAC and inserted in the replacement 9-PAC, thereby retaining the maps generated previous to the failure.

Still referring to FIG. 3, the disclosed embodiment of the 9-PAC 34 includes a GPS clock interface. In general, the 9-PAC requires accurate timing information for various reasons including use in data recording and the need to provide time-stamps for SAMF data. The GPS satellite system provides a means to acquire very accurate time (e.g., accuracy of about 100 nanoseconds) at low cost (e.g., less than about $4,000). The interface to a GPS receiver can be made via a Universal Asynchronous Receiver/Transmitter (UART) or a Universal Synchronous and Asynchronous Receiver/Transmitter (USART) 58 connected to a GPS serial port. A currently preferred embodiment includes an asynchronous serial interface on the 9-PAC to accommodate an un-modified GPS receiver such as a Magnavox 4200. In general, GPS units generate time messages every second on the serial port and generate a very accurate 1 pulse-per-second output. Both of these data sources preferably are made available on the 9-PAC.

For hardware implementation, a variety of single and dual UARTs and USARTs are available in PLCC (i.e., "surface mount") packages. They have very simple interfaces and can generate interrupts. The one-second pulse interface also should be capable of generating an interrupt. The use of a dual UART provides a port for expansion.

The disclosed embodiment of the 9-PAC 34 also includes a SAMF HDLC X.25 serial interface. SAMF is a well-known message format which was defined and approved by the Federal Aviation Administration (FAA). In general, the SAMF data stream is split into six channels running over 9600 baud modems. X.25 is designed to run in packet multiplexers at 56 kbps. Thus, a logical way to provide an interface is to generate a 56 kbps X.25 HDLC data stream that can feed an external multiplexer. If ISDN or some other high-capacity digital interface is available it may be possible to send this data stream directly to the airport's air traffic control system.

Several manufacturers make synchronous serial interface controllers specifically for X.25 use. After the specifics of the SAMF formats and the compatibility of a 56 kbps data stream with the six 9600 baud lines are verified, the necessary components can be selected by a person of ordinary skill in the art.

In the disclosed embodiment, the 9-PAC 34 includes a general purpose serial port 60 which can provide, for example, diagnostic tools and/or a real-time display capability. The diagnostics can contain operations statistics. The real-time display can be implemented with a PC or a workstation running a custom display program.

The 9-PAC board also includes, in the disclosed embodiment, a plurality of off-board communication links 68. In general, as many communication links as possible should be brought out to either the front card edge of the 9-PAC card or to unused pins on the backplane of the ASR-9. This allows the 9-PAC to be connected to another 9-PAC in a nearby slot of the ASR-9, or to an external device for recording data. Note that TMS320C40 communication links run over very limited distances, generally less than twelve inches.

The processes that the above-described 9-PAC board can execute to enhance the performance of a conventional ASR-9 are described below.

Problems encountered when operating the conventional ASR-9 system include radar resolution problems which affect beacon positions, beacon azimuth splits, garbling of beacon codes and altitudes, and reflection (i.e., multipathing) of beacon reply signals. In accordance with the invention, the first three of these problems can be addressed by "beacon target detection" processing performed by a 9-PAC. The fourth problem can be addressed by the 9-PAC performing "beacon reflection processing."

Before beginning a description of either beacon target detection processing or beacon reflection processing, it is helpful to define a few terms. As described previously, a beacon radar system works by transmitting radar interrogations that are received and responded to by a transponder on-board aircraft. The interrogations can be of two types: "mode A" or "mode C." Mode A interrogations request the transponder to respond by sending an identity "code" of the aircraft. Mode C interrogations request the transponder to respond by sending an altitude of the aircraft. After an interrogation, the set of replies or responses by all aircraft in the mainbeam of the radar is known as a "sweep". After a series of successive sweeps, all of the sets of replies received are correlated and one or more aircraft "reports" are generated. A report includes the range, azimuth, identity code, and altitude of the aircraft in the mainbeam of the radar. History and classification of aircraft can be obtained from successive scan reports, and predictions of aircraft future position can be made therefrom. An aircraft "track" includes this history, classification, and predictions.

Having defined various terms used herein, a description of beacon target detection and beacon reflection processing follows. The beacon target detection processing is discussed first, and then the beacon reflection processing is discussed.

Beacon target detection involves processing all beacon replies for a report in a batch mode, using a track file during report formation, and using a track file during code/altitude degarbling. In contrast, the conventional ASR-9 system processes each beacon reply upon its arrival, uses a best guess approach during report formation, and does not even attempt to degarble beacon codes and altitudes. The process of beacon target detection includes creating or forming one or more beacon reply groups (FIGS. 4A and 4B) and then processing the group(s) (FIGS. 4C through 4F).

In general, a reply group is created when multiple-on-range replies are found, and the group is closed when an azimuth gap is found. As described in further detail below, the processing performed on the reply group(s) includes determining whether a group is "perfect" or "perfectible" (FIG. 4C). If a group can be categorized as either perfect or perfectible, certain processing is performed (FIG. 4C). If a group cannot be categorized as perfect or perfectible, other processing is performed (FIGS. 4C through 4F).

Groups are classified as either "open" or "mature." Replies presumably from the same target are grouped together. An informational record (open group) is maintained for each group. There can be 100 such groups open at any given time. A group is considered mature when it has presumably received all the replies that it is going to receive.

There is an informational record for each range cell. The record stores all the parameters for the replies at that range cell. The disclosed embodiment includes 16,384 such range cells, one for each range clock count out to about 68 miles. The following parameters are maintained in each range cell record: indices of reply buffer (described below) entries corresponding to the first and last reply in a range cell, receiving times of the first and last reply in a range cell, the number of replies in a range cell, and a pointer to the group (if any) to which the range cell belongs.

Figure 4A:
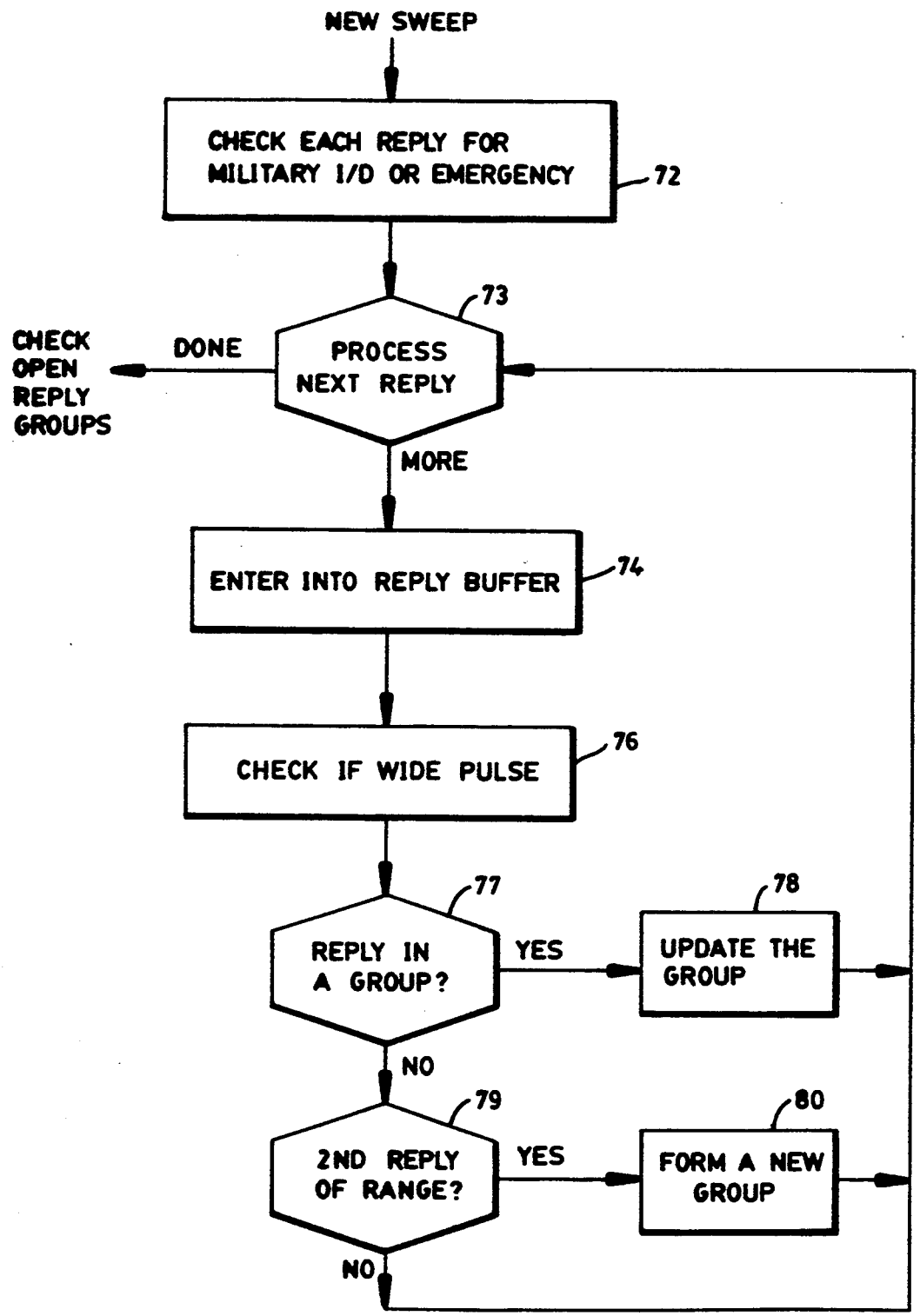
FIGS. 4A through 4F are flowcharts of a process of beacon target detection according to the invention.
Figure 4B:
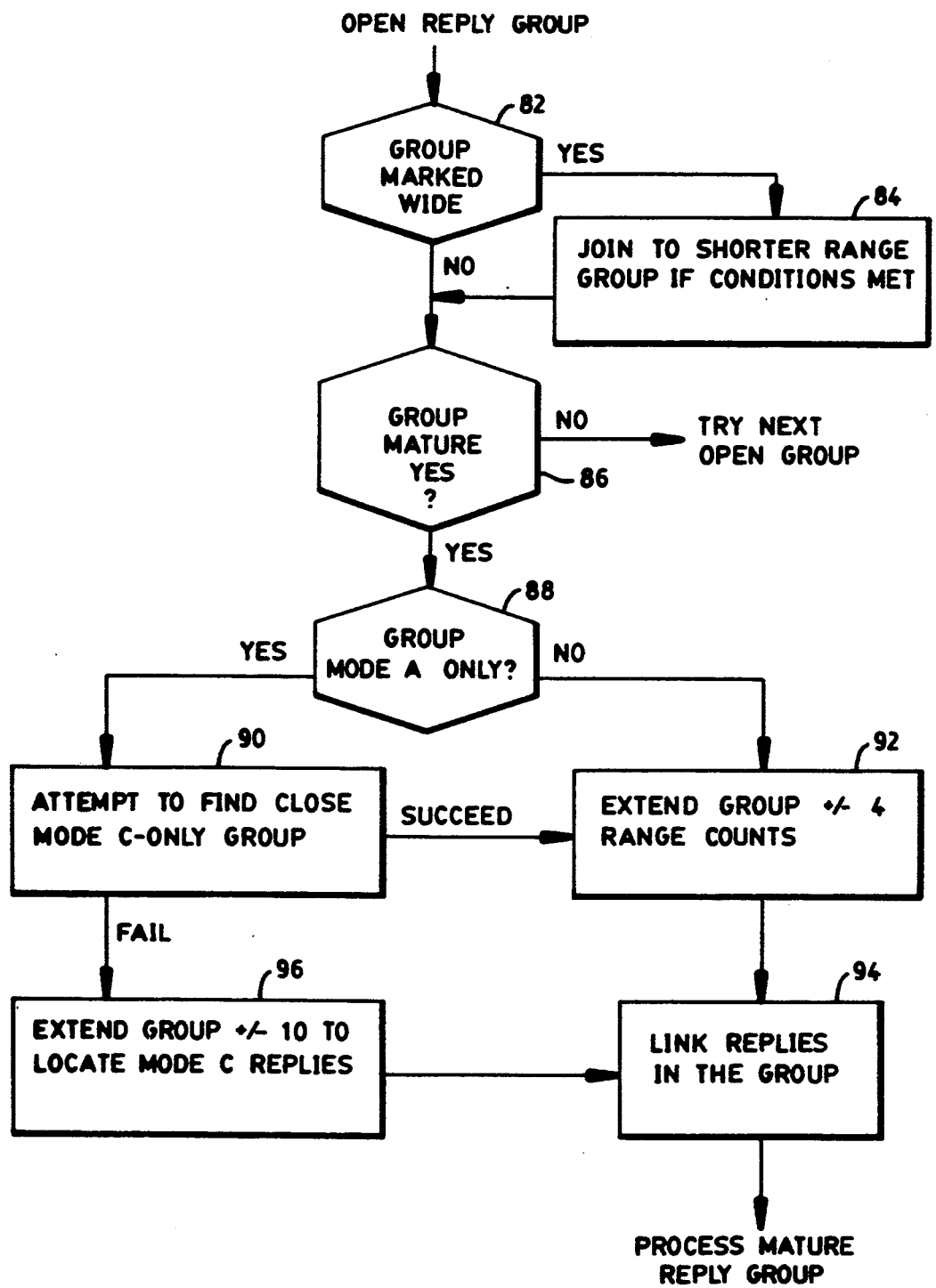
Figure 4C:
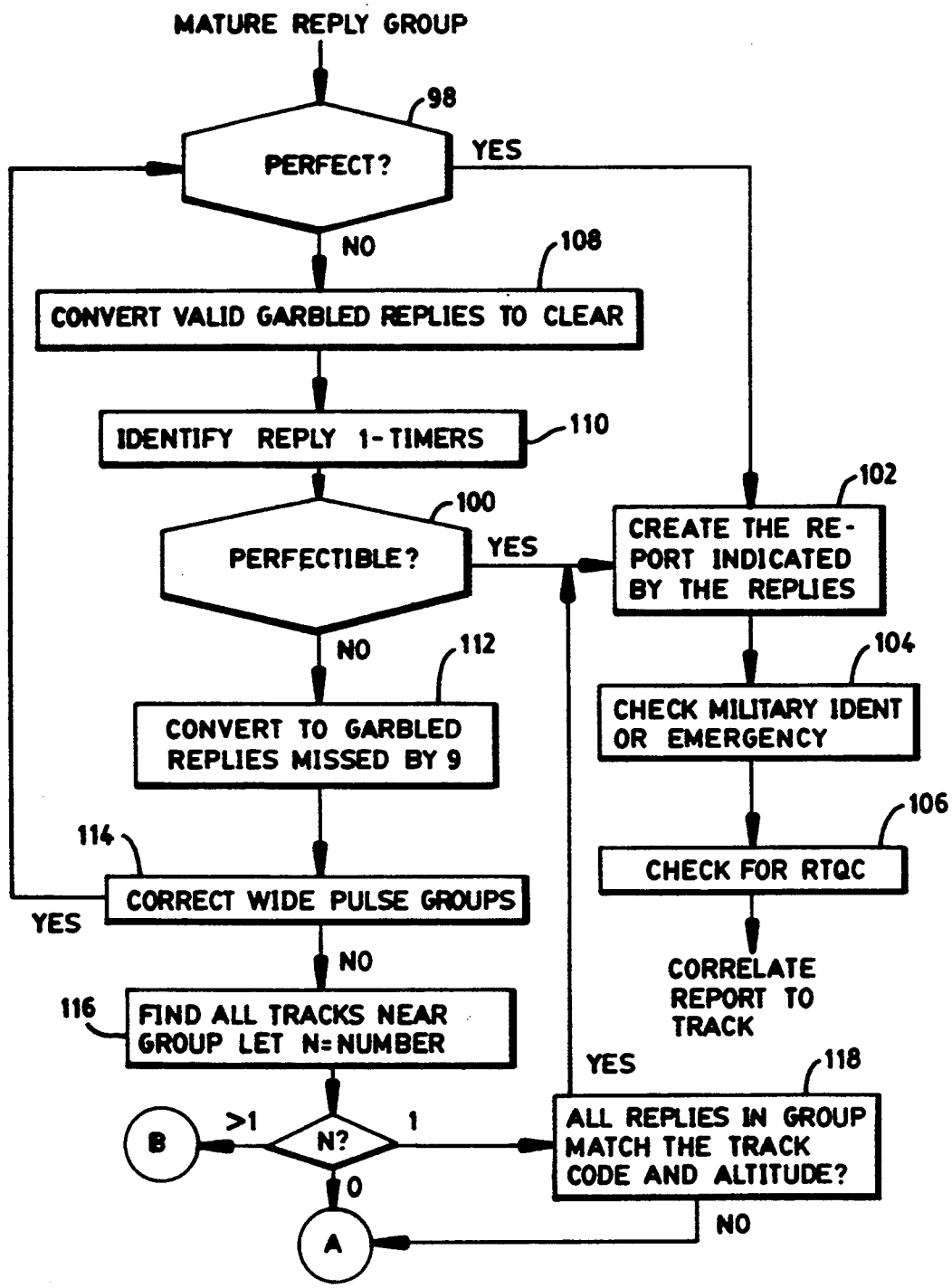

Referring to FIGS. 4A and 4B, for each sweep (which contains either all mode A or all mode C beacon replies), each reply in the sweep is checked for military identification and military emergency (step 72, FIG. 4A). Military identification is recognized when a reply is found in an SPI position of the previous reply, and the codes of the two replies are the same. The second reply is ignored (i.e., it is not placed in the reply buffer). Military emergency is recognized when a set of four replies exists, each reply in the SPI position of the previous reply. (Note that the second or third reply may be absent.) The first reply code is converted to the value 7777, and the other three replies are ignored. When redundant replies come from the same military aircraft (e.g., to indicate identification or emergency), the redundant replies are eliminated.

After step 72 is completed, the group generation process continues to FIG. 4B if all replies in the sweep have been entered into a reply buffer (described below). If one or more replies in the sweep have not yet been placed into the reply buffer (decision box 73), the processing continues to step 74 (FIG. 4A). At step 74, replies are placed into one of the two ring or circular buffers of the MPRAM 50 (FIG. 1). The circular buffer in which the replies are placed will hereinafter be referred to as the reply buffer. As mentioned above, the reply buffer can hold an array of 10,000 records where each record holds all the parameters of a beacon reply. Each record has two pointers. The first pointer identifies the next reply at the same range, and the second pointer identifies the next reply of the same group. Both beacon replies and sweep interrogations are placed into the reply buffer in received-time order.

The next step (step 76) is to check if an aircraft transponder is operating outside of the range of its specifications and producing reply pulses that exceed 550 microseconds. If this is the case, the ASR-9 beacon reply processor will declare two replies for that aircraft. Ideally, both replies will have the same code but be at different ranges. Such a "wide-pulsed" transponder is detected as follows. Every group has three duplicate code counts, one for discrete Mode A, one for non-discrete Mode A, and one for Mode C. When there are two consecutive replies with the same code within ten range counts of each other, the appropriate duplicate code count is incremented for the group to which the longer range reply belongs. A group is marked as due to a wide-pulse if either (i) a duplicate count for discrete Mode $A \geq 3$, or (ii) the duplicate count for non-discrete mode $A \geq 3$ and the duplicate count for mode $C \geq 1$.

If an aircraft transponder is operating outside of the range of its specifications and fails to meet the intermode delay requirement of $3 \pm 0.5$ μsec, the ASR-9 beacon reply processor will declare Mode C replies to be at a different range from the Mode A replies. A failing transponder is detected as follows. Every group has two mode counts, one for Mode A and one for Mode C. Two groups are marked as due to a mode-split if (i) they are within ten range counts of each other, and (ii) the Mode A count for one is zero and the Mode C count for the other is zero.

The corresponding range cell for each reply is initialized or updated as follows (steps 77, 78, 79, and 80). If the current reply is the first one for the range cell, the cell is initialized with the reply. If the current reply is the second for the cell, but 77 acps have passed since the last reply, the cell is initialized with the current reply. Otherwise, the range cell is updated with the current reply. The range cell is initialized with a reply by setting the reply pointers to NULL, setting the range cell's start time and end time to the receiving time of the reply, and setting the reply count to one. The range cell is updated with a new reply by setting the previous reply of the range cell to point to the new reply, setting the new reply's pointers to NULL, setting the end time of the range cell to the receiving time of the new reply, and incrementing the reply count by one. Once all replies for the new sweep are placed into the reply buffer and the corresponding range cell and group (if any) are updated (FIG. 4A), all the groups are examined to see if any are mature (FIG. 4B), starting with the group with the largest range count. At decision box 73 (FIG. 4A), it is decided whether all replies have been processed.

Referring to FIG. 4B, the group is checked to determine if it is marked as "wide pulse" (decision box 82). If it is so marked and the next shorter-range group is within ten range counts (step 84), the two groups are merged. The group is then checked to see if it is mature (decision box 86). A group is considered mature when the group's age, computed as the time elapsed since the start-time of the group, exceeds 55 acps and the gap since the last group reply exceeds the value of "G" (in acps) as given by $$G = 20 - \frac{\text{elapsed time} - 66}{5}.$$

Thus, a group containing replies from two or more targets can be extended up to 166 acps. This limit ensures that no report will be delayed more than one sector by the reply correlation process. If a group is not mature, the process loops back to box 82. If it is mature, the group is checked to determine if it is single-mode (decision box 88).

If a group is mode A only, an attempt is made to find a close mode-C-only group (step 90). If such a close group is found, the group is extended in both directions in range to ±4 range counts to include all the appropriate range cells with one or two replies that belong to the group (step 92). Any replies in these cells that are within 30 acps of the starting time of the group are included. Note that range cells with ≧3 replies are already included. All replies of the group are then linked together in time order (step 94). If a close mode-C-only group cannot be found (step 90), the group is extended in both directions in range to ±10 range counts to locate mode C replies (step 96). Processing then continues to step 94. Before proceeding to the processing of FIGS. 4C-4F, all replies of a mature group are linked together, in time order, with replies on the same sweep, in range order. Range cells with one or two replies that started after the official end time of the done group are saved. This permits these replies, which may belong to another report, to become part of the next group formed at this range. A separate linked list of replies for each mature group is then passed to the target formation procedure (FIGS. 4C-4F).

Referring to FIG. 4C, it is determined whether each mature group of replies is perfect (decision box 98) or perfectible (decision box 100). A group of replies is perfect if it satisfies seven requirements. First, all replies must be designated as ungarbled by the ASR-9 beacon reply processor. Second, all Mode A replies must have the same code. Third, all Mode C replies, if any, have the same code. Fourth, there can never be two replies in the group from the same sweep. Fifth, the range spanned by the replies in the group must be ≦5 counts. Sixth, the azimuth spanned by the replies in the group must be ≦77 acps. Seventh, the largest azimuth gap between successive replies must be ≦11 acps.

The number of reports made from a perfect group and their Mode A codes (step 102) are determined by (i) identifying the set $S_1$ of all tracks whose predicted position falls within the search box for the reply group, (ii) if the code of any track in $S_1$ matches that of the group, making one report with that code, (iii) otherwise if the ORing of the codes of any two tracks matches that of the group, making two reports where one has the code of each track, and (iv) otherwise making one report with the group code.

The range of the perfect report(s) is the weighted average of all the reply ranges. The azimuth of the perfect report(s) is given by $$az = \frac{\sum\limits_{i=1}^{3} az_i + \sum\limits_{i=n-2}^{n} az_i}{6}$$

where n represents the number of replies in the group. If one report is created, the altitude is generated via a "majority rules" process (described below). If two reports are created, the altitudes are generated via a "split altitude" process (described below).

After the reports indicated by the replies are created (step 102), military identification, military emergency, and beacon real-time quality control (RTQC) are checked (steps 104 and 106), and then the report is correlated to the track.

If the group is not perfect (box 98), steps 108 and 110 are performed before it is determined whether the group is perfectible (box 100). Step 108 involves converting garbled replies to clear, and step 110 involves identifying one-timer replies.

The following definitions are given to clarify the description provided herein. A "one-timer" is a reply in the group that is an anomalous reply. It is a real reply that does not belong in the group, a reply corrupted by a fruit reply, or the result of an aircraft transponder or an ASR-9 beacon reply processor malfunction. Multiply-Reply-Sweep one-timer refers to a single sweep which has two replies on it. Range one-timer is only possible if multiple-reply sweeps do not exist for the group. After determining the centroid range for the replies of each mode, if a reply is >3 counts from the centroid and its three neighbors of the same mode on each side are all ≦3, the reply is a range one-timer. Azimuth one-timer is a reply in which the reply on either end of the group differs in azimuth from its neighbor by >11 acps. A garble one-timer reply occurs when a reply is marked as garbled by the ASR-9 beacon reply processor and none of its three neighbors on either side is so marked. If some clear Mode A (or C) code appears three times in the group and another clear code appears only once, the unique code reply is a clear Mode A (or C) one-timer. Garbled Mode A (or C) one-timer is similar as Clear Mode A (or C) one-timer but using garbled Mode A (or C) codes.

The beacon reply garble rules are as follows. In the first pass, for each reply i, check later replies j on the sweep until the maximum range difference with i is exceeded, or until a garbling reply is located that satisfies $$n*17-6 \leq \Delta \rho \leq n*17+4.$$

If such a reply is found, set i's GP (garble plus) to n. Then, for each reply i, check earlier replies j on the sweep until the maximum range difference with i is exceeded or until a garbling reply is located that satisfies $$n*17-4 \leq |\Delta \rho| \leq n*17+6.$$

If such a reply is found, set i's GM (garble minus) to n. During the second pass, for each Mode A reply i, if the neighboring Mode A reply j has the same code as it, set $$newGP_i = \text{Min}\{GP_i, GP_j\}$$

$$newGM_i = \text{Max}\{GM_i, GM_j\}.$$

For each reply i, if the neighboring reply j is of the opposite mode than it, set $$newGP_i = \text{Min}\{GP_i, GP_j\}$$

$$newGM_i = \text{Max}\{GM_i, GM_j\}.$$

For each reply i that was called garbled by the ASR-9's beacon reply processor but for which no garbling GP or GM has been found, set $newGP_i = 1$. For each reply i, store new values as determined by $GP_i = newGP_i$ and $GM_i = newGM_i$. For the third pass, all Mode A replies i with code 1200 are forced to be clear (i.e., $GP_i = \text{null}$, and $GM_i = \text{null}$). If three or more 1200 replies are in the group, all Mode A replies with codes of 0000, 0200, or 1000 are set to 1200 and are forced to be clear. All Mode C replies with code 0000 are forced to be clear. In the fourth pass, the set $S_1$ of all tracks having a predicted position falling within the search box for the reply group is identified. The subset $S_2$ of tracks for which one or more Mode A replies (whether clear or garbled) match the track's Mode A code is identified. For each Mode A reply i that matches the Mode A code of a track in $S_2$, the reply is set such that it will be forced clear (i.e., $GP_i = \text{null}$, and $GM_i = \text{null}$). For each Mode C reply i, attempt to find a track j in the set $S_2$ such that the following conditions are met:

a. reply i represents a decodable FL $f_i$,
b. $|F1_j - f_i| \leq 2$,
c. no other FL $f_k$ that satisfies this equation exists in the reply group, and
d. the Mode C code of reply i is not a superset of the code of any FL $f_m$ which satisfies $|F1_j - f_m| \leq |F1_j - f_i|$.

If successful, set the reply to be forced clear (i.e., $GP_i = \text{null}$, and $GM_i = \text{null}$).

The process of determining whether a group is perfectible (box 100) as opposed to perfect (box 98) is performed as follows. All one-timer replies are removed from the beacon reply group. All garbled replies that were forced to be clear are set to clear. If the resulting group satisfies the perfect conditions, the perfect process described above is applied to form the report.

If a mature group is neither perfect nor perfectible, the beacon target detection process executes a "track matching" procedure. One type of track matching is single track matching, and another type is two track matching. In general, single track matching determines whether all the replies in the group have come from one aircraft, specifically, the aircraft represented by a given track. In contrast, two track matching realizes that it is possible for the reply group to contain replies from two tracks if two or more tracks exist in the reply group search box. Two track matching is attempted before one track matching to prevent a track that comes "close" to matching the replies from "stealing" the group from two tracks which, when combined, might perfectly match the replies.

After some initial processing to address garbled replies missed by the ASR-9 beacon reply processor (step 112) and to correct wide-pulse groups (step 114), the number of tracks in the area of the group is determined (step 116).

Figure 4D:
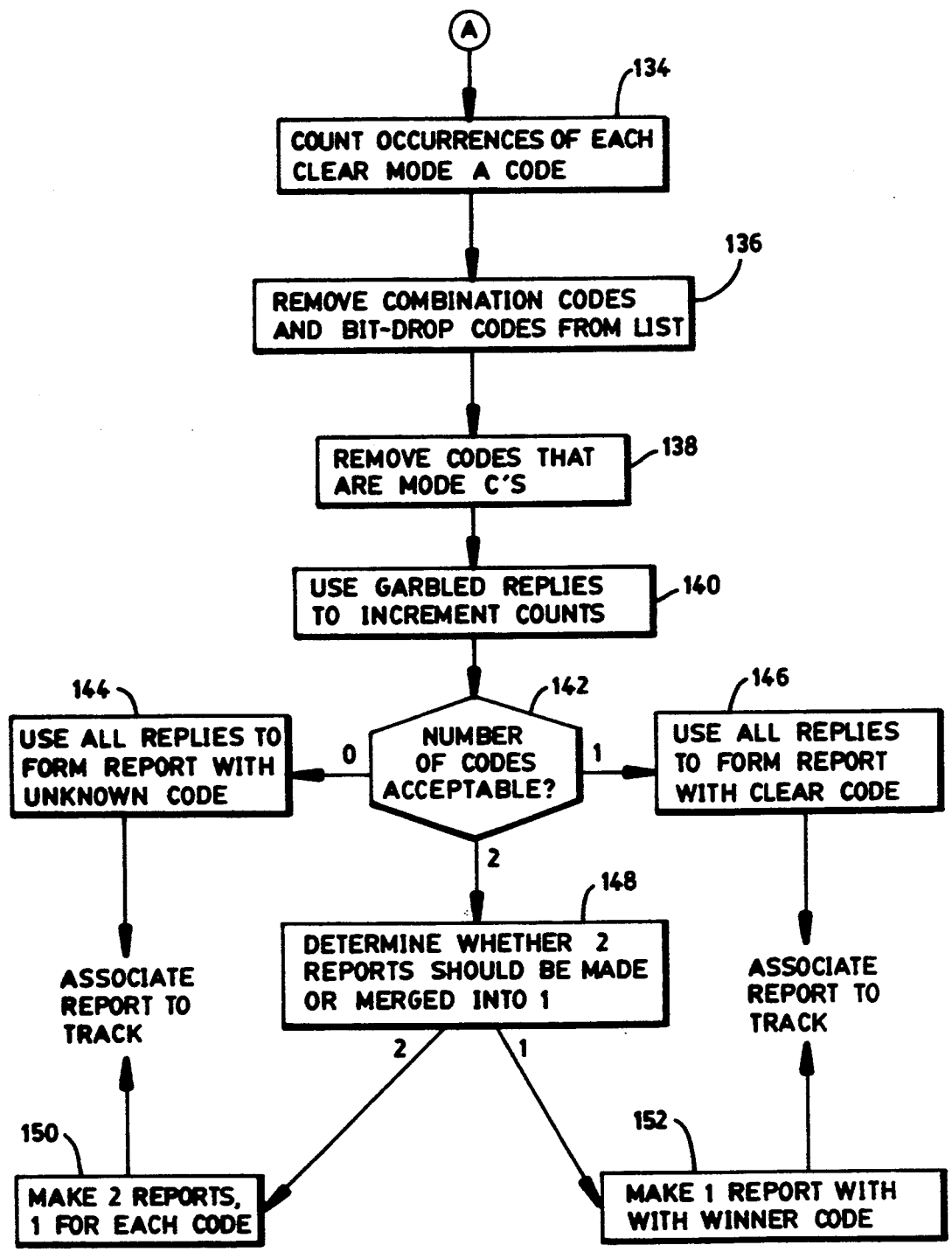
Figure 4E:
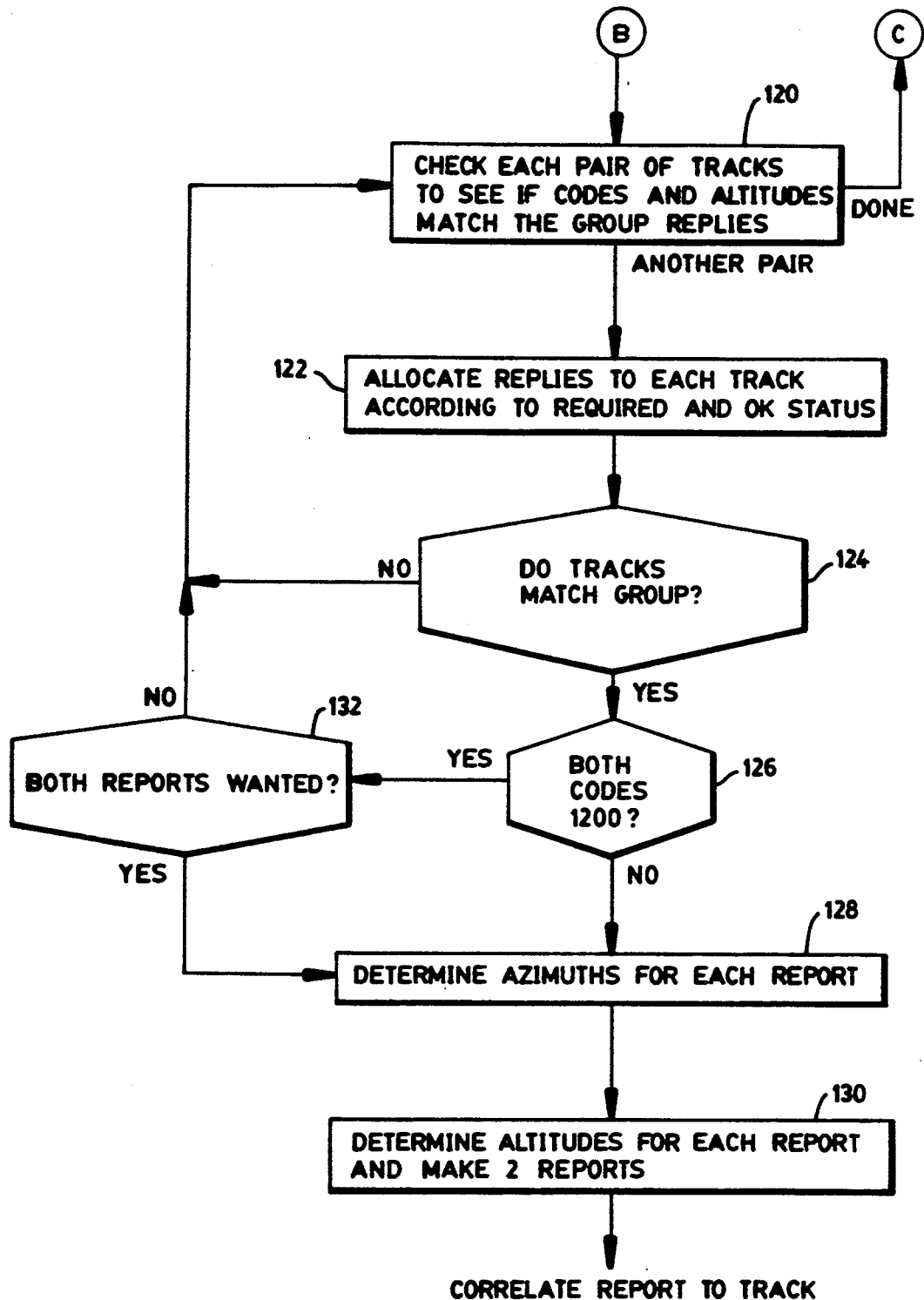

If it is determined that more than one track is in the area of the group, beacon target detection processing proceeds to FIG. 4E. Referring to FIG. 4E, the two track matching process tests for matching against the codes and altitudes of two tracks (step 120). To apply this process, the group must have clear Mode A codes that match the Mode A codes of two tracks. If there are more than two tracks, the best two are selected. Replies are allocated (step 122) to each track according to Required (R) and OK status, as indicated below.

In a first case of two track matching, tracks have different Mode A codes. Each Mode A reply is tested against 3 codes: track 1 Mode A code, track 2 Mode A code, and track 1 code ORed with track 2 code. The match rule is as follows. Using the clear reply code bits, either an exact match or at most one bit drop is required. Each track accumulates a Required (R) count and an OK count as indicated in TABLE 1 below, in which 1=pass, 0=fail.

TABLE 1

| A result | B result | C result | Action |
|---|---|---|---|
| 0 | 0 | 0 | Failure |
| 0 | 0 | 1 | 1R, 2R |
| 0 | 1 | 0 | 2R |
| 0 | 1 | 1 | 2R |
| 1 | 0 | 0 | 1R |
| 1 | 0 | 1 | 1R |
| 1 | 1 | 0 | 10K, 20K |
| 1 | 1 | 1 | 10K, 20K |

If the number of failure replies $\leq 2$, the required counts for both tracks 1 and $2 \geq 3$, and the (R+OK) counts for both tracks 1 and $2 \geq 3$.

In a second case of two track matching, tracks have the same Mode A code. In this case, the Mode C replies are tested for track agreement. Each track needs a clear Mode C that agrees with one of its five levels, and each track needs a required count of two and a (R+OK) count of three for that altitude level.

If the tracks match (decision box 124) and the reply codes are both not 1200 (box 126), the azimuths and altitudes (steps 128 and 130) are determined for each report, and then two reports (one for each track) are created. If the tracks do not match (box 124), processing loops back to step 120. Also, if the tracks do not match and the reply codes are both 1200 (boxes 124 and 126), it must be decided whether both reports are wanted or not (decision box 132). If both are not wanted, loop back to step 120. Otherwise, proceed to steps 128 and 130.

Figure 4F:
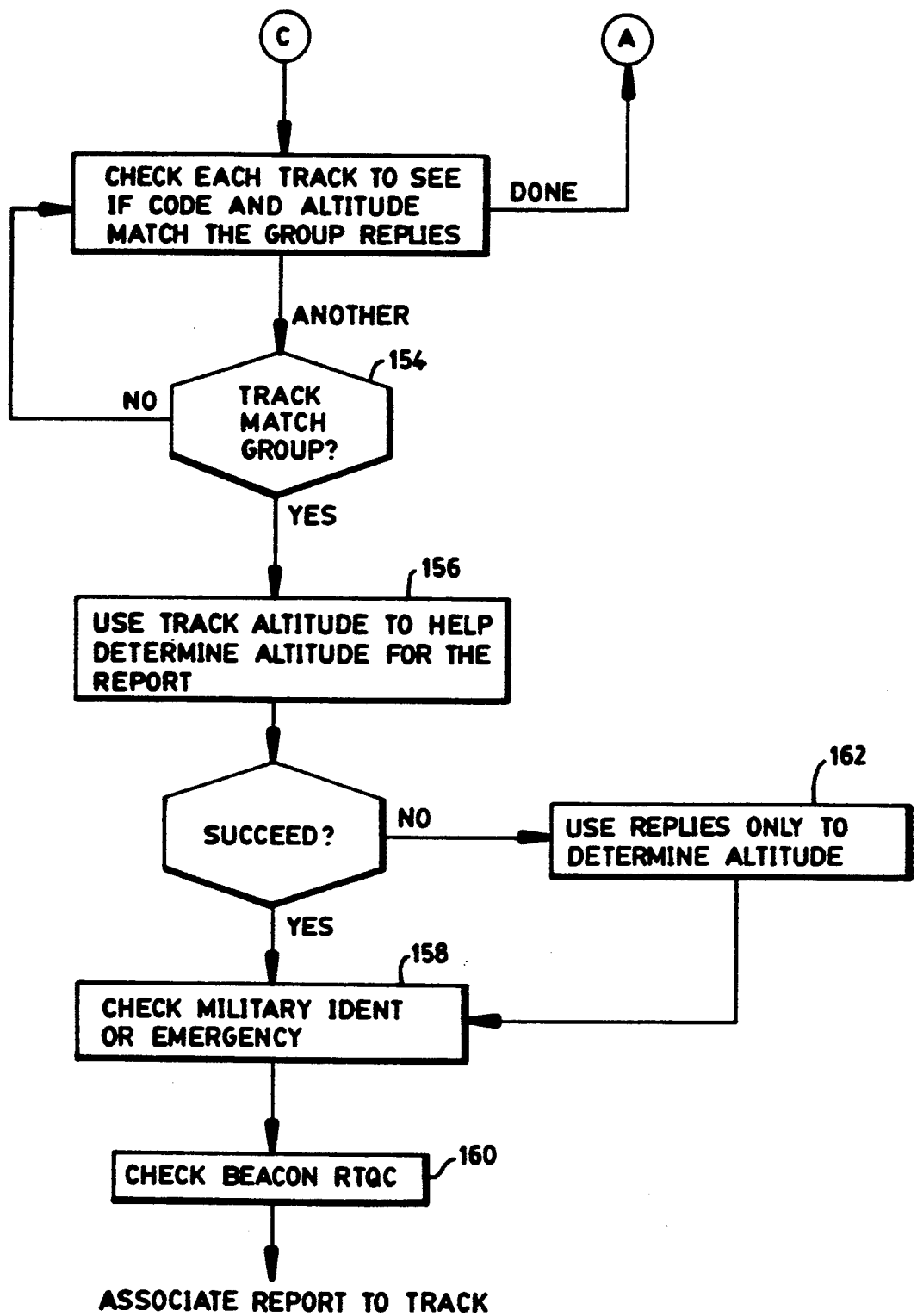

Once each pair of tracks have been checked to determine if the codes and altitudes match the group replies (step 120), the processing moves to FIG. 4F where it is determined if the track matches the group (decision box 154). If it does match, the track altitude is used in determining the altitude for the report (step 156). If the track altitude can be used to determine the report altitude, the military identification, military emergency, and the beacon real-time quality control (RTQC) are checked (steps 158 and 160), and then the report is associated or correlated to the track. If, however, the track altitude cannot be used to determine the report altitude, the altitude for the report is determined by using only the replies (step 162), and then steps 158 and 160 are executed.

If it is determined at step 116 (FIG. 4C) that one track is in the area of the group, single track matching is performed. At step 118, it is determined whether all replies in the group match the track code and altitude (step 118). To this end, each reply has its code, Mode A or C, compared with that of the track. Code matching ignores bits in a known garbled region of the reply (an attempt to match the Mode S confidence bit logic). Code matching also allows for single bit drops by the ASR-9 beacon reply processor. If all replies, except for at most two failures, pass the code match test, processing continues to step 102. Otherwise, the processing of FIG. 4D is performed. To prevent passage by default, the total number of clear bits (those not in a garble region), summed over all replies, must be $\geq 36$. If a sweep has two replies on it, the two codes are ORed together and the resulting code is used for that sweep. This logic prevents wide-pulse-transponder aircraft from forming two reports split by range as now occurs in the conventional ASR-9. If the two replies came from different aircraft, the ORed code would not match the track and no harm would result.

In general, for single track matching, the reply group must satisfy the following criteria. First, the range spanned by the replies in the group must be $\leq 5$ counts. Second, the azimuth spanned by the replies in the group must be $\leq 77$ acps. Third, the largest azimuth gap between successive replies must be $\leq 11$ acps, and the track must have an F1 altitude field (known altitude).

A normal or first pass in the single track matching process includes the following. For each reply, of either Mode A or Mode C, use the garble fields GP and GM to set a garble mask to determine which bits are "in the clear." Next, check the number of Mode A replies that fail to match the Mode A code of the track. For Mode A match, the reply, in its clear bits, must either (i) exactly match the track Mode A, or (ii) be one bit drop from the track Mode A *and* not be 1200 *and* not exactly match another track in the group search box. Then, check, for each "agree" flight level of the track, the number of Mode C replies that fail to match. The five "agree" flight levels for the track are given by $F1-2$, $F1-1$, $F1$, $F1+1$, and $F1+2$. For Mode C match, the reply, in its clear bits, must either (i) exactly match the track flight level, or (ii) be one bit drop from the track flight level. Single track matching succeeds for a track if the number of failed replies for the track Mode A plus the number of failed replies for the best track flight level $\leq 2$. If single track matching succeeds for one and only one track, a report is created. The report Mode A code is the Mode A code of the track. The report Mode C code is given according to the normal altitude determination rules.

A second chance pass in the single track matching includes the following. If there is only one track in the reply group search box, and single track matching fails for that track, a second chance is given to the report. The second chance is intended to handle the cases where the true garble condition of some of the replies is missed. This can occur for instance when a true reply is eliminated by the ASR-9 beacon reply processor as being a phantom. For the second chance, all replies are given the same garble fields which are GP, the smallest value of $GP_i$ that occurs two or more times, and GN, the smallest value of $GN_i$ that occurs two or more times. For Mode A match, the reply must (i) have at most one bit drop from the track Mode A *and* not be 1200, and (ii) have all extra code bits relative to the track Mode A code occur in the garble region defined above. For Mode C match, the same rules apply, with all five agree flight levels tested. Second chance single track matching succeeds for a track if the number of failed replies for the track Mode A plus the number of failed replies for the best track flight level $\leq 2$. The report Mode A code is the Mode A code of the track. The report Mode C code is given according to the normal altitude determination rules.

If it is determined at step 116 (FIG. 4C) that no tracks are in the area of the group, the processing of FIG. 4D is performed. Referring to FIG. 4D, a list of all clear mode A codes is created and each occurrence of a clear mode A code is counted (step 134). If a code is the result of the ORing of two other codes, that code is removed from the list and the counts of the two codes are increased (step 136). Also, if a code is a one-bit drop of another code and its count is lower, the code is removed from the list and the other code count is increased (step 136). All mode C codes are then removed from the list (step 138). For each garbled mode A reply, the count of any code for which the garbled reply is a superset (one-bit drop allowed) is incremented (step 140). Depending on whether an acceptable number of codes is zero, one, or two (decision box 142), the process proceeds to step 144, 146, or 148, respectively. At step 144, all replies are used to form a single report having an unknown code. At step 146, all replies are used to form a single report having a clear code. At step 148, a determination is made to form two reports or to merge the two reports to form one report. If two reports should be made, the two reports are created, one report for each code (step 150). If the two reports should be merged, a single report is made with the winner code (step 152). In all cases, after one or more reports are made, the reports are associated to the track, as indicated in FIG. 4D.

Other processes according to the invention include the majority rules altitude process mentioned above, the split altitude process mentioned above, a known track altitude formation process, an unknown track altitude formation process, and a report-to-track correlation process.

In the majority rules altitude process, if more than half of the altitude replies have the same CLEAR code and that code is a decodable flight level, that flight level will be placed in the report. Note that altitude code 0000 is "brackets-only" and is a valid altitude type that agrees only with itself. The confidence is based on the number of such agreeing clear replies and on whether the flight level agrees with the track. Altitude agreement with the track for non-brackets is defined as (i) Track Field F1 exists and (ii) Report and Track F1 satisfy $\Delta \leq 2$. If the reply code agrees with the track, the confidence is "high" if there is $\geq 1$ reply. If the reply code disagrees with the track or no track exists, the confidence is "low" if there is one reply or high if there is $\geq 2$ replies.

For the split altitude process, when a clear Mode C reply is thought to represent the ORing together of the altitude replies from two different known tracks (each with field F1 existing), an attempt is made to re-create the separate altitude replies. This process is used by perfect overlap, perfectible overlap, and two track matching. Using the five "agree" flight levels for track 1 (which are given by $F1_1-2$, $F1_1-1$, $F1_1$, $F1_1+1$, $F1_1+2$) and the five "agree" flight levels for track 2, a matrix of the twenty-five ORed Mode C codes is generated, with track 1 levels as the rows and track 2 levels as the columns. If the actual reply Mode C code appears in one and only one row, report 1 is assigned the flight level for that row with high confidence, otherwise report 1 is assigned no altitude (garble low confidence). If the actual reply Mode C code appears in one and only one column, report 2 is assigned the level for that column with high confidence, otherwise report 2 is assigned no altitude (garble low confidence). Note that if either track is brackets-only and the reply code flight level agrees with the other track, the reports are assigned brackets-only and the reply flight levels are both assigned high confidence.

The known track altitude formation process is used when a track with a non-bracket-only F1 field is known for the group. If the majority rules process applies to the Mode C replies, it is used. If no Mode C replies exist in the group, unknown altitude is placed in the report. If all Mode C replies are brackets-only, brackets-only is placed in the report. The confidence is high if $\geq 2$ replies exist, low if only 1. Each clear Mode C code in the reply group is identified, and the number of occurrences of each is counted. If the code with the most bits is the most common, its flight level agrees with the track F1, and all other clear codes are a 1-bit drop from it, all clear replies are assigned to that code. If only one clear flight level exists, it agrees with the track F1, and its count is $\geq 2$, that FL is placed in the report with high confidence. If no clear FL agrees with the track F1, levels $F1-2$, $F1-1$, F1, $F1+1$, $F1+2$ are added to the list with a clear count of 0. Each clear count is incremented by one for each garbled Mode C reply that is a superset of the clear code. Any flight level having a count of 0 is eliminated. If no flight level agreeing with the track F1 is left in the list, the group is processed by the unknown track altitude formation process. If two clear altitudes are one FL apart, they are combined; this handles the transition during a beam dwell. If two clear altitudes differ by one bit, one level agrees with the track and the other doesn't, and the agreeing one has at least as large a count, the other level is folded into the agreeing level. If more than one clear Mode C code still exists, the one with the largest count is selected. If a tie exists, the tied level that is closest to the track F1 is selected if any of the tied levels agrees with the track F1, or else the tied one with the most bits that is decodable is selected. If the winning flight level does not agree with the track F1, the group is processed by the unknown track altitude formation process. The only FL or the winning FL is placed in the report. If two agreeing flight levels tied for the largest count, the confidence is set to medium. The altitude confidence is determined as follows. If (i) the number of clear replies for FL is $\geq 2$, (ii) the count for FL is $\geq 3$, or (iii) the count for FL is $> \frac{1}{2}$ of the Mode C replies, the confidence is high. If the number of clear replies for FL is 1, the confidence is medium. Otherwise, the confidence is low.

The unknown track altitude formation process is used when either no track is known for the group, or the track is a bracket-only track. If the majority rules process applies to the Mode C replies, it is used. If no Mode C replies exist in the group, if all the Mode C replies were found (by the ASR-9's reply processor) to be garbled, or if all clear replies were undecodable, unknown altitude is placed in the report. If track is bracket-only, bracket-only is placed in the report if (i) $\geq 3$ bracket-only replies (high confidence), (ii) 2 bracket-only replies (medium confidence), (iii) 1 bracket-only reply, all others garbled (medium confidence), or (iv) 1 bracket-only reply, 2 total replies (low confidence). Each clear Mode C code in the reply group is identified, and count the number of occurrences of each is identified. If the code with the most bits is the most common and all other clear codes are a 1-bit drop from it, all clear replies are assigned to that code. Each clear count is incremented by one for each garbled Mode C reply that is a superset of the clear code. If two clear altitudes are one FL apart, they are combined; this handles the transition during a beam dwell. If more than one clear Mode C code still exists, the one with the largest count is selected. If a tie exists, the one with the most bits that is decodable is selected. The only FL or the winning FL is placed in the report. The altitude confidence is determined as follows. If (i) the number of clear replies for FL is $\geq 2$, and (ii) the count for FL is $\geq 2$ more than any other count, and (iii) the count for FL is $\geq \frac{2}{3}$ of the Mode C replies, the confidence is high. If only (ii) and (iii) apply, the confidence is medium. Otherwise, the confidence is low.

In the report-to-track correlation process, each report is associated to the "best matching" track of the set of tracks in its search region. Mode A code agreement represents 2 points, 1-Bit code disagreement corresponds to 1 point, and altitude agreement represents 1 point as well. The track with the highest score is selected. If a tie exists, the track nearest to report position is selected. The track chooses the best associating report to correlate with it. The choice is made one-half of a scan after associations to permit accumulation of all associants. Tracks with no associations are coasted. For a new track, two coasts means drop. For a confirmed track, four coasts mean drop. Reports not correlating to a track initiate a new track.

Some track altitude rules are indicated in TABLES 2-6 which follow.

TABLE 2

| | Track File Fields |
|---|---|
| F1. | Track Alt - Predicted Altitude |
| | special value for brackets only |
| | special value for no Mode C |
| | special value for null |
| F2. | Track Last Alt - Altitude of Last Scan Report |
| | only when F1 alt disagreement occurred |
| | otherwise null |
| F2c. | Track Last Alt Confidence - Confidence of F2 |
| F3. | Track Alt Rate - Predicted Per Scan Alt Change |

TABLE 2-continued

Track File Fields null if not yet computed

TABLE 3

Track Field Initiation

A. High Confidence (HC) Report Alt:
| | |
|---|---|
| F1. | null |
| F2. | Report Alt |
| F2c. | H |
| F3. | null |

B. Medium Confidence (MC) Report Alt:
| | |
|---|---|
| F1. | null |
| F2. | Report Alt |
| F3. | null |

C. Low Confidence (LC) Report Alt
| | |
|---|---|
| F1. | null |
| F2. | null |
| F2c. | null |
| F3. | null |

TABLE 4

Definition of F1 Alt Agreement

| | |
|---|---|
| A. | If report is LC, agreement cannot occur |
| B. | Else report and track F1 must satisfy $\Delta \leq 2$ |
| C. | Else fail F1 agreement |

TABLE 5

Definition of F2 Alt Agreement

| | |
|---|---|
| A. | If report is LC, agreement cannot occur |
| B. | Else if F2 exists and report and F2c are both HC, report and track F2 must satisfy $\Delta \leq 5$ |
| C. | Else if F2 exists and either report or F2c is MC, report and track F2 must satisfy $\Delta \leq 2$ |
| D. | Else fail F2 agreement |

TABLE 6

Track Field Update

| | |
|---|---|
| A. If | report is LC, coast F1 if non-null |
| B. Else | if F1 agreement with HC report, adjust F3 using last and new report alts predict F1 using report alt and new F3 set F2 and F2c to null |
| C. Else | if F1 agreement with MC report, coast F1 |
| D. Else | if F2 agreement, compute F3 using F2 and report alt predict F1 using report alt and new F3 set F2 and F2c to null |
| E. Else | if report is HC or F2c is M coast F1 if non-null replace F2 with report alt replace F2c with report confidence |
| F. Else | coast F1 if non-null |

In brief, the beacon target detection processing enhances the performance of a conventional ASR-9 by handling a variety of situations which the conventional ASR-9 cannot address. For example, the beacon target detection processing handles garbled identification code, garbled altitude, dropped beacon reply pulses, wide-pulse transponders, overlapping aircraft, abutting aircraft, range splits, azimuth splits, undetected garble, F2-drop phantoms, fruit replies, and short runlengths.

Figure 5A:
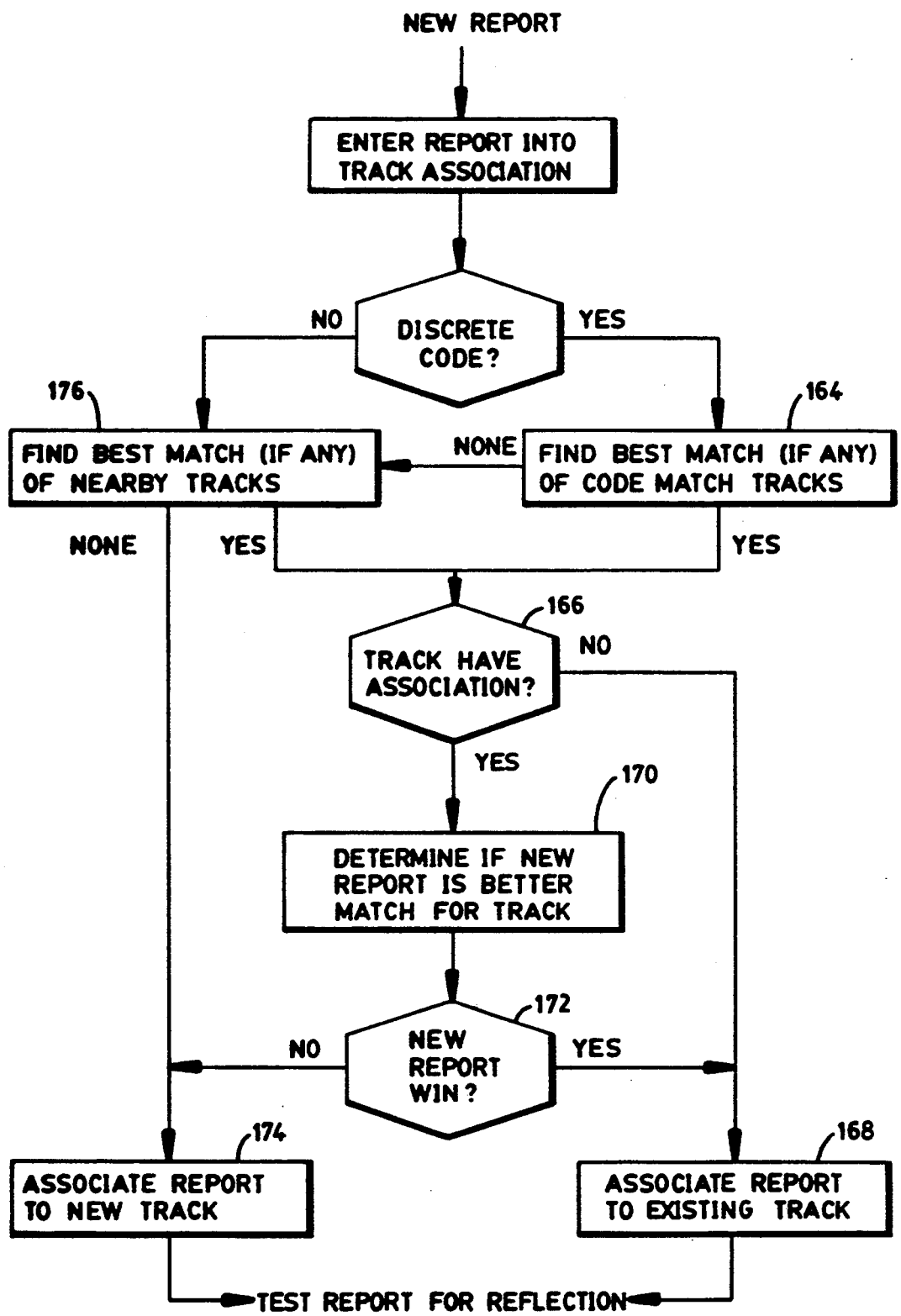
FIGS. 5A and 5B are flowcharts of beacon reflection processing according to the invention.
Figure 5B:
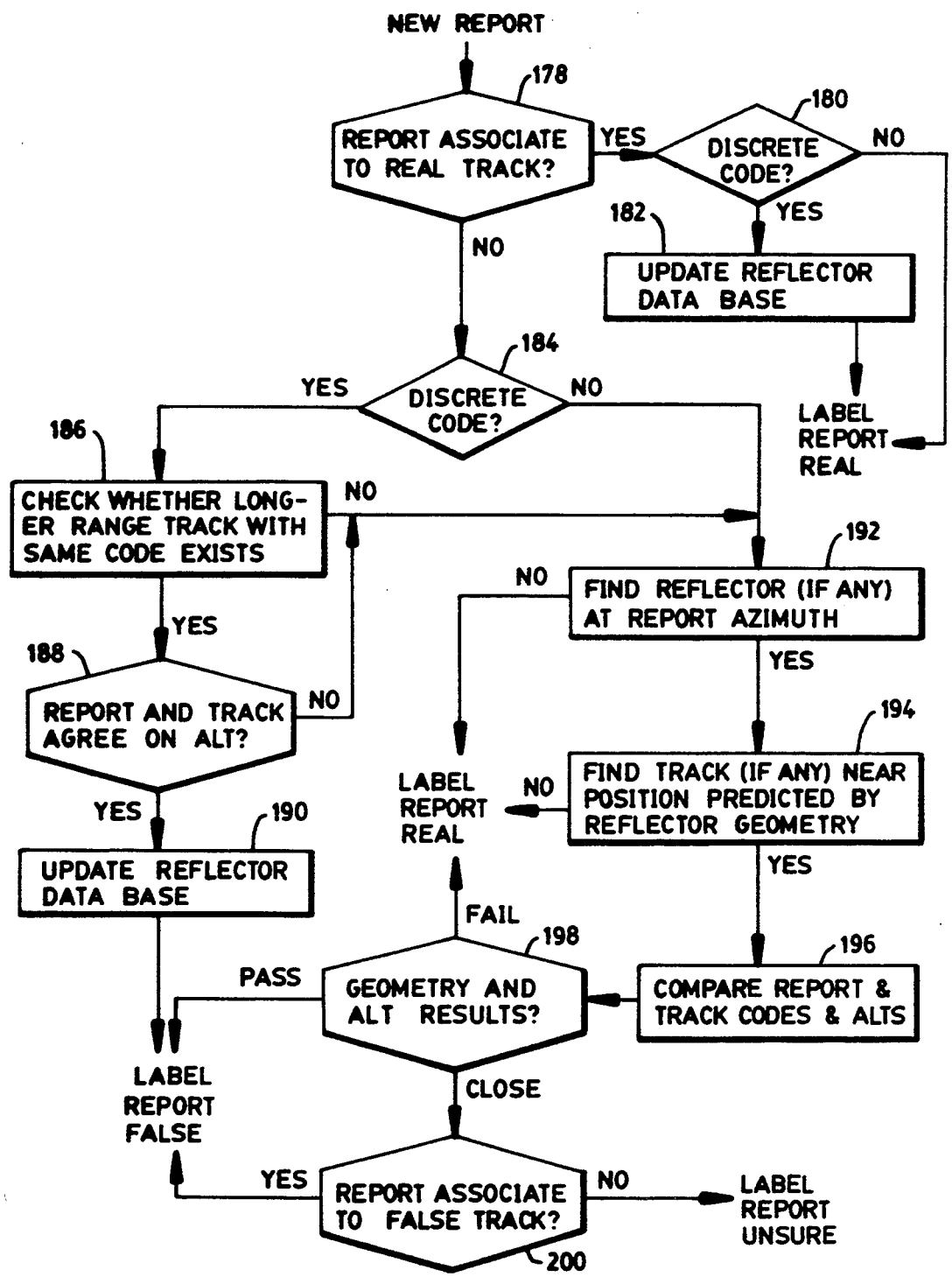

In accordance with the invention, reflection problems also are addressed by processes which run on the 9-PAC board. Referring to FIGS. 5A and 5B, beacon reflection processing involves performing three main tasks. First, a candidate report with a discrete code is subjected to the separation tests for reflection against all the tracks with that particular code. This addresses the problem of tracker-based reflection for a discrete code. Second, a dynamic reflector management file (a reflector file or reflector database) is built and maintained based upon the knowledge gained from the discrete reflections. Third, a candidate report within a reflection zone (i.e., inside the azimuth extent of an existing reflector) is compared to the real tracks, if any, located near the position predicted from the reflector's range and orientation angle. This address the problem of reflector-based reflection.

General rules for beacon reflection are as follows. A report may be real, false, or of uncertain type (FIG. 5B). Uncertainty occurs when a possible reflection report cannot conclusively be proven to be false. At the beginning, a report is assumed to be real; it must be proven to be otherwise. If a report is associated to a track, the status of the track is used in the decision. In particular, a report correlated to a real track is set to real without testing. A report labeled uncertain by the reflection test is output as false if it correlates to a false track, and it is output as real otherwise. A track is initiated in the uncertain state; it becomes permanently real after updates by two real reports, and it becomes temporarily false after updates by two false reports. If either of a track's first two reports is labeled real, they are considered uncertain for the track update process; this allows false reports to appear before the real track pops up. Codes '1200' through '1277' and other special codes, as well as codes ending with a '00' (e.g. '5500'), are considered non-discrete. All other codes are considered discrete. For each discrete code, a list of all the tracks with that code is maintained. Restricted codes and restricted zones are VSPs. Emergency codes are examples of restricted codes; reports with restricted codes will not be subjected to the reflection algorithm. Known trouble zones can be restricted; reports within a restricted zone will be output as real independent of the result of the reflection test.

Referring still to FIG. 5A, tracker-based reflection rules for a discrete code are as follows. If a best match can be found (step 164), the track is tested to see if it is associated with a report (decision box 166). If the track does not have an association, the report is associated to the existing track (step 168), but if the track does have an association, it is determined if a new report is a better match for the track (step 170). If the new report is indeed a better match (decision box 172), the new report is associated with the existing track (step 168). If, however, the new report is not a better match, the report is associated to a new track (step 174).

For a non-discrete code, the track is tested to determine the best match of nearby tracks (step 176). If a best match cannot be found, the report is associated with a new track (step 174). If, however, a best match is found, the processing continues to step 166 as described above.

Regardless of whether the code is discrete or not, the beacon reflection processing proceeds to FIG. 5B (from step 174 or step 168 of FIG. 5A) to test the report for reflection. Referring to FIG. 5B, if the report correlates to a real track (decision box 178), the report is labeled as real. Depending on whether the code is discrete or not (decision box 180), the reflector database is updated (step 182) before the report is labeled real.

If the report does not correlate to a real track (box 178) and the code is discrete (decision box 184), it is determined at step 186 whether a longer range track with the same code exists. If such a track does exist, the report and track are tested to see if they agree on altitude (decision box 188). If there is agreement on altitude, the reflector database is updated (step 190), and the report is then labeled false.

If the report does not correlate to a real track (box 178) and the code is not discrete (decision box 184), or if the report does not associate to a real track (box 178) and the code is discrete (box 184) but a longer range track with the same code does not exist (step 186) or the report and the track do not agree on altitude (box 188), it is determined at step 192 if there is a reflector at the report azimuth. If there is not such a reflector, the report is labeled as real. If there is such a reflector, it is determined if a track is near the position predicted by reflector geometry (step 194). If there is no such track, the report is labeled as real. If, however, there is such a track, the report and track codes and altitudes are compared (step 196). The geometry and altitude results (steps 194 and 196) can fail, pass, or come close to predetermined standards (decision box 198). If the results fail, the report is labeled as real. If they pass, the report is labeled as false. If the results come close, it is determined if the report is associated with a false track (decision box 200). If the report is associated with a false track, the report is labeled as false, but if it is not so associated, the report is labeled as unsure.

In general, a reflector's parameters are it's average range, average orientation angle, average azimuth, and azimuth width. Also, the width of a reflector is actual extent plus two degrees on each side (i.e. the minimum acp minus two degrees through the maximum acp plus two degrees).

Reflector management rules are as follows. Three reflector samples from two aircraft form a transient reflector. This means that two different aircraft must see the reflector, and one of them must see it twice. A transient reflector gains permanent status after it has been seen on two consecutive days. A reflector's age is checked every time a discrete report within the reflector's azimuth extent is found to be real. A permanent reflector is purged one month after it was last seen. A transient reflector is purged one day after it was last seen. No hand entries are made for reflectors.

For the special problems associated with close-in reflections, the following rules apply. The aircraft is allowed to be between the sensor and the reflector. If the report associates with the probable responsible track, the track must have a recent update (no coasting) for the candidate report to be considered for reflection. Those reports that associate with the candidate responsible track are held, for 110 acps from boresite, to see if any other reports are forthcoming for the track.

In general, the processes described above are for execution by a 9-PAC board according to the invention. When one or more 9-PAC boards are inserted into a conventional ASR-9 system in place of the conventional DPRAM board(s), these processes compensate for the problems encountered by a conventional ASR-9 system and the performance of the ASR-9 system is thereby enhanced in accordance with the invention. The conventional ASR-9 system does not have the computational capacity to execute these processes.

Other modifications and implementations will occur to those skilled in the art without departing from the spirit and the scope of the invention as claimed. Accordingly, the invention is to be defined not by the preceding illustrative description, but by the following claims.

What is claimed is:

1. A radar processor, comprising:
   a first multi-port memory device having memory which can be accessed by at least three ports, the device including
      a first port for receiving input radar data from a data providing means,
      a second port coupled to the input of an array signal processor which performs radar processing,
      a third port coupled to a first digital signal processor which performs radar processing, and
      an arbiter for coordinating and determining when each of the three ports can access the memory of the first multi-port memory device,
      wherein the array signal processor and the first digital signal processor communicating with each other via the first multi-port memory device,
   a second multi-port memory device having memory which can be accessed by at least three ports, the device including
      a first port coupled to the output of the array signal processor,
      a second port coupled to the input of a message interface processor which formats radar target and weather reports from processed radar data,
      a third port coupled to a second digital signal processor which performs radar processing, and
      an arbiter for coordinating and determining when each of the three ports can access the memory of the second multi-port memory device,
      wherein the array signal processor and the second digital signal processor communicate with each other via the second multi-port memory device, and the first and second digital signal processors communicate with each other via a separate interface between the first and second digital signal processors.

2. The radar processor of claim 1 wherein the arbiter of the first multi-port memory provides highest priority for memory accesses to the array signal processor, second highest priority to the data providing means, and third highest priority to the first digital signal processor.

3. The radar processor of claim 1 wherein the input data comprises primary radar return data and beacon reply data from aircraft.

4. The radar processor of claim 1 wherein the first multi-port memory device, the second multi-port memory device, the array signal processor, the first digital signal processor, and the second digital signal processor cooperate to generate and store a report of beacon replies from aircraft by:
   creating a group having a plurality of beacon replies from radar targets which are represented by the input radar data;
   determining whether the group satisfies predetermined requirements including all beacon replies in the group being recognizable and all replies having a common beacon code;
   if the group does not satisfy the predetermined requirements, determining whether the group contains beacon replies which originate from two different aircraft, and then creating a report which matches each of the two aircraft to the corresponding replies; and if the group does not contain beacon replies originating from two different aircraft, determining whether all replies in the group originate from a single aircraft as represented by a single target track, and then generating a report which matches the single aircraft to the replies.

5. The radar processor of claim 4 wherein the radar processor also determines whether the report is due to a reflection of a beacon reply signal.

6. The radar processor of claim 5 wherein the radar processor also identifies the report as false if it is due to a reflection and as true if it is not due to a reflection.

* * * * *